US012517237B1

(12) United States Patent
Lin et al.

(10) Patent No.: US 12,517,237 B1
(45) Date of Patent: Jan. 6, 2026

(54) LIDAR SENSOR SYSTEM INCLUDING POLARIZER OPTICS

(71) Applicant: Aurora Operations, Inc., Pittsburgh, PA (US)

(72) Inventors: Sen Lin, Santa Clara, CA (US); Andrew Steil Michaels, Santa Clara, CA (US)

(73) Assignee: AURORA OPERATIONS, INC, Pittsburgh, PA (US)

( * ) Notice: Subject to any disclaimer, the term of this patent is extended or adjusted under 35 U.S.C. 154(b) by 258 days.

(21) Appl. No.: 17/848,900

(22) Filed: Jun. 24, 2022

(51) Int. Cl.
*G01S 7/499* (2006.01)
*B60W 60/00* (2020.01)
*G01S 7/481* (2006.01)
*G01S 17/89* (2020.01)
*G01S 17/931* (2020.01)

(52) U.S. Cl.
CPC ............ *G01S 7/499* (2013.01); *G01S 7/4816* (2013.01); *G01S 17/89* (2013.01); *G01S 17/931* (2020.01); *B60W 60/001* (2020.02); *B60W 2420/408* (2024.01)

(58) Field of Classification Search
CPC ...................................................... G01S 7/499
See application file for complete search history.

(56) References Cited

U.S. PATENT DOCUMENTS

| | | | |
|---|---|---|---|
| 5,917,596 A * | 6/1999 | Jenkins | G01S 7/4972 356/477 |
| 8,988,754 B2 | 3/2015 | Sun et al. | |
| 9,476,981 B2 | 10/2016 | Yaacobi et al. | |
| 10,338,321 B2 | 7/2019 | Hosseini et al. | |
| 10,627,517 B2 | 4/2020 | Yaacobi et al. | |
| 10,761,272 B2 | 9/2020 | Hosseini et al. | |
| 10,948,598 B1 * | 3/2021 | Prabhakar | G01S 7/499 |
| 11,150,411 B2 | 10/2021 | Hosseini et al. | |
| 11,372,106 B2 | 6/2022 | Yaacobi et al. | |

(Continued)

FOREIGN PATENT DOCUMENTS

| | | | | |
|---|---|---|---|---|
| CN | 117242387 A | * | 12/2023 | ......... G02B 17/0856 |
| EP | 2376980 B1 | * | 10/2012 | ........... G02F 1/3532 |

(Continued)

OTHER PUBLICATIONS

Fritz, Bruce, et al., Ultraviolet beam splitter characterization for use in a CubeSat optical system, SPIE Journal of Applied Remote Sensing, vol. 13, Issue 3, 032503 (Jun. 2019). https://doi.org/10.1117/1.JRS.13.032503 (hereinafter "Fritz"). (Year: 2019).*

*Primary Examiner* — Jean Paul Cass
(74) *Attorney, Agent, or Firm* — Dority & Manning, P.A.

(57) ABSTRACT

A light detection and ranging (LIDAR) sensor system that may be included in an autonomous vehicle includes a transmit pixel, a receive pixel, and a polarized beam splitter. The transmit pixel is configured to emit a transmit beam. The receive pixel is configured to receive a first polarization orientation of a returning beam and a second polarization orientation of the returning beam. The polarized beam splitter is optically coupled to receive the returning beam from the receive pixel. The polarized beam splitter is configured to direct the first polarization orientation of the returning beam into a first waveguide and direct the second polarization of the returning beam into a second waveguide.

20 Claims, 9 Drawing Sheets

(56) References Cited

U.S. PATENT DOCUMENTS

| | | | |
|---|---|---|---|
| 11,579,253 B2* | 2/2023 | Byrnes | G01S 7/4815 |
| 2015/0346340 A1* | 12/2015 | Yaacobi | G01S 7/499 |
| | | | 356/5.11 |
| 2019/0317198 A1* | 10/2019 | Wang | G01S 7/4818 |
| 2020/0150272 A1* | 5/2020 | Stevenson | G01S 17/10 |
| 2020/0370878 A1* | 11/2020 | Vollmerhausen | G01S 7/4813 |
| 2022/0003937 A1 | 1/2022 | Hosseini et al. | |
| 2022/0113417 A1* | 4/2022 | Wang | G01S 7/4917 |
| 2022/0276347 A1* | 9/2022 | Satyan | G01S 7/4816 |
| 2022/0381888 A1* | 12/2022 | Rakuljic | G01S 17/931 |
| 2023/0003857 A1* | 1/2023 | Klemme | G01S 7/4814 |
| 2024/0094360 A1* | 3/2024 | Piggott | G01S 7/4917 |

FOREIGN PATENT DOCUMENTS

| | | | | |
|---|---|---|---|---|
| WO | WO-0058689 A1 * | 10/2000 | | G01B 11/27 |
| WO | WO-2020182591 A1 * | 9/2020 | | G01S 17/10 |

* cited by examiner

LIDAR SENSOR SYSTEM INCLUDING POLARIZER OPTICS

TECHNICAL FIELD

This disclosure relates generally to a light detection and ranging (LIDAR) sensor system. In particular, the LIDAR sensor system can be used for vehicles including autonomous vehicles.

BACKGROUND INFORMATION

Frequency Modulated Continuous Wave (FMCW) LIDAR directly measures range and velocity of an object by directing a frequency modulated light beam. The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

BRIEF SUMMARY OF THE INVENTION

Implementations of the disclosure include a light detection and ranging (LIDAR) sensor system including a transmit pixel, a receive pixel, and a polarized beam splitter. The transmit pixel is configured to emit a transmit beam. The receive pixel is configured to receive (i) a first polarization orientation of a returning beam that is received in response to the transmit beam; and (ii) a second polarization orientation of the returning beam. The polarized beam splitter is optically coupled to the receive pixel and configured to receive the returning beam from the receive pixel, direct the first polarization orientation of the returning beam into a first waveguide, and direct the second polarization orientation of the returning beam into a second waveguide.

In an implementation, the LIDAR sensor system further includes a substrate layer in which the polarized beam splitter is disposed, wherein the transmit pixel is an edge-coupled transmit pixel configured to emit the transmit beam along an edge of the substrate layer, and wherein the receive pixel is an edge-coupled receive pixel configured to receive the returning beam along the edge of the substrate layer.

In an implementation, the LIDAR sensor system further includes a first substrate layer and a second substrate layer. The transmit pixel is an edge-coupled transmit pixel configured to emit the transmit beam along a first edge of the first substrate layer. The second substrate layer is coupled to the first substrate layer. The receive pixel is an edge-coupled receive pixel configured to receive the returning beam along a second edge of the second substrate layer. The second substrate layer includes the polarized beam splitter, the first waveguide, and the second waveguide.

In an implementation, the second substrate layer includes a Group 4 element and the first substrate layer includes a Group 3 or Group 5 element.

In an implementation, the Group 4 element include germanium or silicon, and the Group 3 or Group 5 element includes aluminum, gallium, indium, thallium, phosphorus, or arsenic.

In an implementation, the LIDAR sensor system further includes a substrate layer including the polarized beam splitter, the first waveguide, and the second waveguide. The transmit pixel is surface-emitting through a substrate layer and the receive pixel is surface-receiving through the substrate layer.

In an implementation, the transmit pixel is offset from the receive pixel by an offset dimension.

In an implementation, the transmit pixel and the receive pixel are included in a substrate layer having a first surface disposed opposite a second surface. The transmit pixel is disposed closer to the first surface and the receive pixel is disposed closer to the second surface.

In an implementation, the LIDAR sensor system further includes a receive waveguide optically coupled between the receive pixel and the polarized beam splitter. The receive waveguide is configured to transmit the returning beam from the receive pixel to the polarized beam splitter.

In an implementation, the transmit pixel is configured to emit the transmit beam in the first polarization orientation and the second polarization orientation.

In an implementation, the first polarization orientation is orthogonal to the second polarization orientation.

In an implementation, the transmit beam and the returning beam are a narrow-band near-infrared wavelength having a linewidth less than 0.02 nm.

In an implementation, the LIDAR sensor system further includes a substrate layer including a transmit waveguide. The transmit waveguide delivers source light to the transmit pixel and the transmit pixel is configured to emit the transmit beam in response to receiving the source light. The substrate layer also includes the first waveguide and the second waveguide.

Implementations of the disclosure include an autonomous vehicle control system for an autonomous vehicle including a LIDAR sensor system and one or more processors. The LIDAR sensor system includes a transmit pixel, a receive pixel, a polarized beam splitter. The transmit pixel is configured to emit a transmit beam. The receive pixel is configured to receive a returning beam that is received in response to the transmit beam. The polarized beam splitter is optically coupled to the receive pixel and configured to receive the returning beam from the receive pixel. The polarized beam splitter is configured to direct a first polarization orientation of the returning beam into a first waveguide and configured to direct a second polarization orientation of the returning beam into a second waveguide. The one or more processors are configured to control the autonomous vehicle in response to the returning beam.

In an implementation, the returning beam is the transmit beam reflecting off of a target.

In an implementation, the transmit pixel is offset from the receive pixel by an offset dimension.

In an implementation, the transmit beam and the returning beam are a same narrow-band near-infrared wavelength having a linewidth less than 0.02 nm.

In an implementation, the autonomous vehicle control system further includes a substrate layer. The transmit pixel is an edge-coupled transmit pixel configured to emit the transmit beam along an edge of the substrate layer that the polarized beam splitter is disposed in and the receive pixel is an edge-coupled receive pixel configured to receive the returning beam along the edge of the substrate layer.

In an implementation, the one or more processors is configured to generate a LIDAR image in response to a first intensity of the first polarization orientation of the returning beam and a second intensity of the second polarization orientation of the returning beam. The one or more processors is configured to control the autonomous vehicle in response to the LIDAR image.

Implementations of the disclosure include an autonomous vehicle including a LIDAR sensor system and one or more processors. The LIDAR sensor system includes a substrate layer, a transmit pixel, a receive pixel, and a polarized beam splitter. The transmit pixel is configured to emit a transmit beam. The receive pixel is configured to receive a returning beam that is received in response to the transmit beam. The polarized beam splitter is optically coupled to receive the returning beam from the receive pixel. The polarized beam splitter is configured to direct a first polarization orientation of the returning beam into a first waveguide and configured to direct a second polarization orientation of the returning beam into a second waveguide. The transmit pixel, the receive pixel, the polarized beam splitter, the first waveguide, and the second waveguide are disposed in the substrate layer. The one or more processors are configured to control the autonomous vehicle in response to the returning beam.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
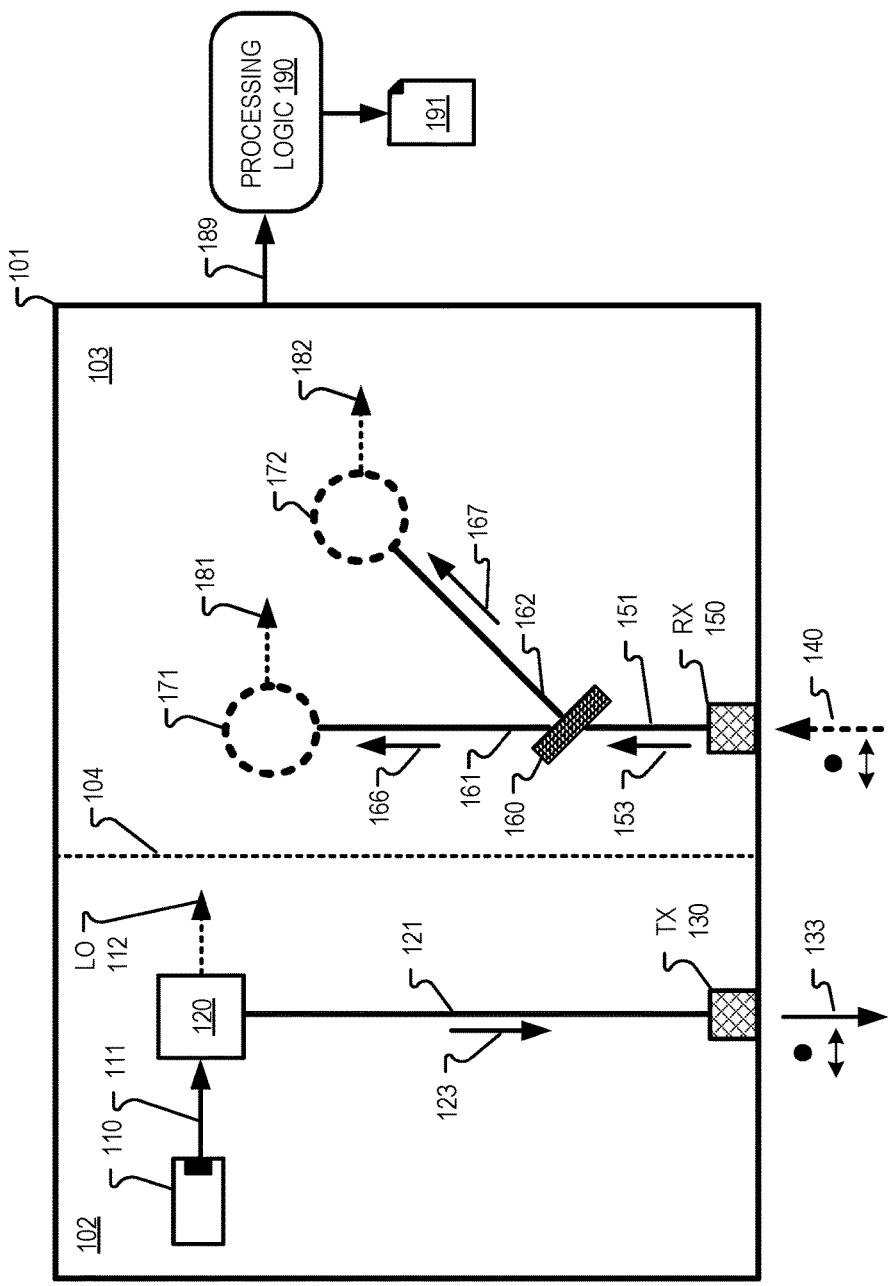
FIG. 1 illustrates a LIDAR system diagram including a LIDAR device and processing logic, in accordance with aspects of the disclosure.

Implementations of a LIDAR device with internal polarizer optics are described herein. The LIDAR device may include LIDAR pixels. A LIDAR pixel can include one or more modules, one or more integrated chips, or one or more electric circuits. In addition, a LIDAR pixel can be implemented as a single packaged chip or implemented as modular design such that a LIDAR pixel includes multiple packaged chips. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

Solid-state LIDAR devices are an improvement over the mechanical moving parts of conventional LIDAR by reducing or eliminating mechanically moving parts required to steer the optical beam for LIDAR operation. Frequency Modulated Continuous Wave (FMCW) LIDAR directly measure range and velocity of an object/target by directing a frequency modulated, collimated light beam at the object. The light that is reflected from the object/target is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

In some LIDAR systems a transmit beam is emitted into the environment and encounters a target. The transmit beam reflects/scatters off of the target and is received by the LIDAR system as a return beam. The return beam may include different polarization orientations. The intensity of the different polarization orientations included in the return beam may assist in generating an image of the target(s) in the surrounding environment. The intensity of the different polarization orientations of the return beam may assist in determining the phase of the return beam and/or the material of the target, for example.

Implementations of the disclosure include a LIDAR device including a transmit pixel, a receive pixel, and a polarized beam splitter. The transmit pixel may emit a near-infrared beam and the receive pixel may receive a first polarization orientation and a second polarization orientation of a returning beam that is the transmit beam reflecting off a target. The polarized beam splitter is optically coupled to receive the infrared returning beam from the receive pixel and direct the first polarization orientation to a first waveguide and direct the second polarization to a second waveguide. The polarized beam splitter may be disposed in a substrate layer that the transmit pixel and the receive pixel may be edge-coupled with respect to an edge of the substrate layer to emit the transmit beam and receive the returning beam. In an implementation, the transmit pixel is disposed in a first substrate layer and a polarized beam splitter is disposed in a second substrate layer that the receive pixel is edge-coupled with respect to an edge of the second substrate layer that is bonded to the first substrate layer. These and other implementations are described in more detail in connection with FIGS. 1-5C.

FIG. 1 illustrates a LIDAR system diagram 100 including a LIDAR device 101 and processing logic 190, in accordance with aspects of the disclosure. However, the present invention is not limited to the particular LIDAR system architecture shown in FIG. 1. Any suitable chip design architecture can be used to implement a LIDAR pixel or LIDAR system. For example, transmit and receive optical antennas can be implemented as a single module or a single integrated chip or implemented as separate modules or chips. As another example, first and second coherent receivers can be implemented as a single module or a single integrated chip or implemented as separate modules or chips.

LIDAR device 101 may have a transmit portion 102 and a receive portion 103 denoted by dashed-line 104 in FIG. 1. In some implementations, transmit portion 102 includes a light source 110, an optional splitter 120, a transmit waveguide 121, and a transmit pixel 130. Receive portion 103 includes a receive pixel 150, a receive waveguide 151, a polarized beam splitter 160, a first waveguide 161, and a second waveguide 162. Receive portion 103 may also include a first optical mixer 171 and/or a second optical mixer 172.

In operation, light source 110 may emit light 111. Light source 110 may be a laser source that emits narrow-band light. The narrow-band light may have a full width at half-maximum (FWHM) linewidth that is less than 20 nm. The narrow-band light may have a linewidth less than 0.02 nm. In an implementation, the narrow-band light is 1550 nm+/−0.01 nm. In an implementation, the narrow-band light is 1310 nm+/−0.005 nm. Light 111 may be infrared light having a wavelength between approximately 700 nm to 3000 nm. Light 111 may be near-infrared light having a wavelength between approximately 700 nm to 1600 nm. Light 111 may propagate to an optional splitter 120 that splits light 111 into a local oscillator signal 112 and source light 123. Source light 123 may of course have the attributes of light 111. Source light 123 propagates through transmit waveguide 121 to transmit pixel 130. Transmit pixel 130 is configured to emit a transmit beam 133 into an environment. Transmit pixel 130 may be a single-polarization transmit pixel or a dual-polarization transmit pixel. If transmit pixel 130 is a dual-polarization transmit pixel, transmit pixel 130 may emit a transmit beam 133 having both s-polarized light and p-polarized light, as illustrated in FIG. 1. If transmit pixel 130 is a single-polarization transmit pixel, transmit pixel 130 may emit only one polarization orientation of transmit beam 133.

Transmit beam 133 propagates in the external environment and encounters a target such as an object, in some implementations. Transmit beam 133 reflects off of the target and a portion of the reflection is received by receive pixel 150 as returning beam 140. Returning beam 140 may include a first polarization orientation and a second polarization orientation, as illustrated in FIG. 1. Receive pixel 150 is configured to receive both the first polarization orientation and a second polarization orientation of returning beam 140 and incouple returning beam 140 into receive waveguide 151 as incoupled returning beam 153. Receive waveguide 151 is optically coupled between receive pixel 150 and polarized beam splitter 160 and configured to guide incoupled returning beam 153 from receive pixel 150 to polarized beam splitter 160.

Polarized beam splitter 160 is optically coupled to receive the incoupled returning beam 153 from receive pixel 150, in some implementations. Polarized beam splitter 160 is configured to direct the first polarization orientation of the returning beam into first waveguide 161 as first polarization orientation light 166 and configured to direct the second polarization orientation of the returning beam into second waveguide 162 as second polarization orientation light 167. The first polarization orientation may be orthogonal to the second polarization orientation. For example, the first polarization orientation may be s-polarized light and the second polarization orientation may be p-polarized light. The intensity of first polarization orientation light 166 may be different from second polarization orientation light 167.

Optionally, first optical mixer 171 may generate a first output signal 181 in response to receiving first polarization orientation light 166 and local oscillator signal 112. Output signal 181 may be an electrical signal generated in response to optical signals 112 and 166. Output signal 181 may be considered a "beat signal" that represents a range and/or velocity of one or more objects in the environment of a LIDAR system. Second optical mixer 172 may generate a second output signal 182 in response to receiving second polarization orientation light 167 and local oscillator signal 112. Second output signal 182 may be an electrical signal generated in response to optical signals 112 and 167. Second output signal 182 may also be considered a "beat signal" that represents a range and/or velocity of one or more objects in the environment of a LIDAR system.

Processing logic 190 is configured to receive LIDAR output signal 189 and generate LIDAR image 191 in response to LIDAR output signal 189, in some implementations. LIDAR output signal 189 may include one or both of output signals 181 and 182. Therefore, processing logic 190 may generate LIDAR image 191 in response to a first intensity of the first polarization orientation of the returning beam and a second intensity of the second polarization orientation of the returning beam. In some implementations, one or more processors of an autonomous vehicle are configured to control the autonomous vehicle in response to receiving LIDAR image 191.

In prior LIDAR systems, complex external optical systems have been used to separate different polarization orientations of returning light. However, external optical systems present additional costs and added manufacturing alignment steps between the receive pixel(s) and the external optics. In implementations of the disclosure, the polarized beam splitter 160 is disposed in a substrate where receive pixel 150 and waveguides 151, 161, and 162 are also formed. Thus, the beam splitting functionality can be precisely internalized into a substrate with other components of the receive portion 103 using photolithography and deposition techniques.

In other prior LIDAR systems, two separate receive pixels (one for each polarization orientation) have been used to receive and measure the different polarization orientation in a returning beam. Implementations of the disclosure may benefit from a single receive pixel incoupling two different polarization orientations of returning beam 140 so that fewer receive pixels are required to measure the intensity of two different polarization orientations and the single receive pixel also takes up less chip/substrate real estate for miniaturization purposes.

Figure 2A:
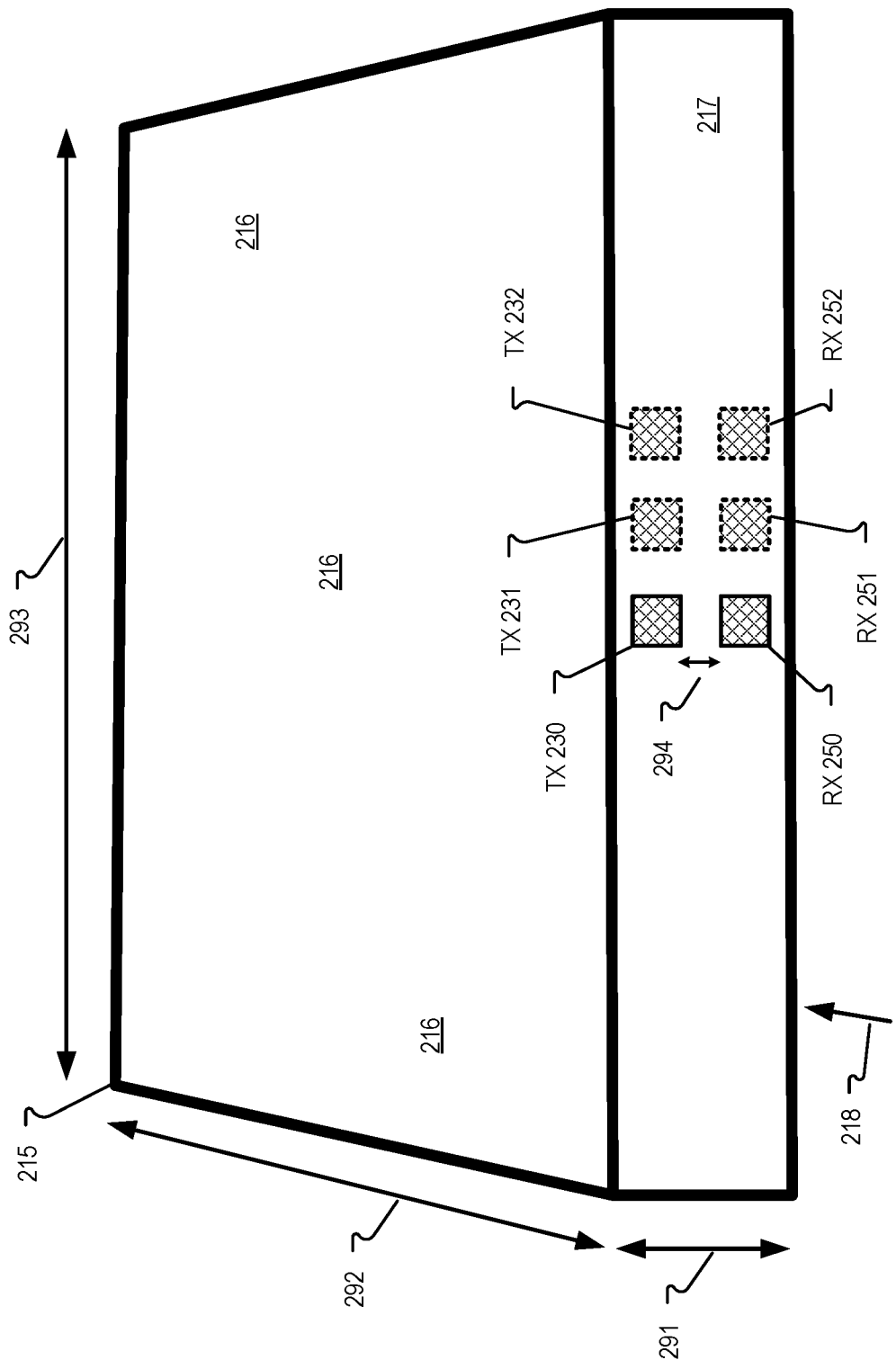
FIGS. 2A-2B illustrate edge-coupled implementations of pixels with a substrate layer, in accordance with aspects of the disclosure.

FIG. 2A illustrates an edge-coupled implementation of pixels with a substrate layer 215, in accordance with aspects of the disclosure. Substrate layer 215 includes a first surface 216 disposed opposite a second surface 218. An edge 217 of substrate layer 215 is disposed between the first surface 216 and the second surface 218. Edge 217 may be approximately perpendicular to first surface 216 and second surface 218. Substrate layer 215 has a depth/thickness 291, a width 292, and a length 293. First surface 216 also has a width 292 and a length 293, in FIG. 2A. Second surface 218 may also have a width 292 and a length 293. Depth/thickness 291 has a dimension that is less than width 292 and length 293. Substrate layer 215 may be a portion of a wafer that was diced, in some implementations.

In FIG. 2A, transmit pixel 230 is an edge-coupled transmit pixel configured to emit a transmit beam (e.g. transmit beam 133) along edge 217 of substrate layer 215. The transmit beam (not specifically illustrated) may be emitted in an out-of-the-page direction that is orthogonal to edge 217, for example. The transmit beam may be emitted at an angle that is not orthogonal to edge 217, in other implementations. Still referring to FIG. 2A, receive pixel 250 is an edge-coupled receive pixel configured to receive a returning beam (e.g. returning beam 140) along edge 217 of substrate layer 215. The returning beam (not specifically illustrated) may propagate in-to-the-page in a direction that is orthogonal to edge 217, for example. The returning beam may also propagate in a direction that is not orthogonal to edge 217, in other implementations. Edge-coupled transmit pixel 230 is offset from edge-coupled receive pixel 250 by an offset dimension 294.

In FIG. 2A, edge-coupled transmit pixel 230 is disposed closer to first surface 216 while edge-coupled receive pixel 250 is disposed closer to second surface 218. Optionally, substrate layer 215 may have an array of edge-coupled transmit pixels and edge-coupled receive pixels such as second transmit pixel 231 paired with second receive pixel 251, and third transmit pixel 232 paired with third receive pixel 252. Of course, the array of edge-coupled pixels is not limited to three pairs of pixels and may include any number of pairs of pixels.

While not particularly illustrated, all or a portion of the components of transmit portion 102 and receive portion 103 of FIG. 1 may be fabricated into or coupled to substrate layer 215. For example, polarized beam splitter 160 and/or waveguides 121, 151, 161, and 162 may be included in substrate layer 215. Waveguides 121, 151, 161, and 162 may be silicon, silicon nitride, or silicon dioxide. In an implementation, substrate layer 215 may be silicon dioxide and waveguides 121, 151, 161, and 162 are formed of silicon nitride with the silicon dioxide of substrate layer 215 functioning as a cladding layer for the silicon nitride waveguides. Polarized beam splitter 160 may be formed in a void in substrate layer 215 using deposition fabrication techniques. Substrate layer 215 may be transparent to infrared wavelengths.

Figure 2B:
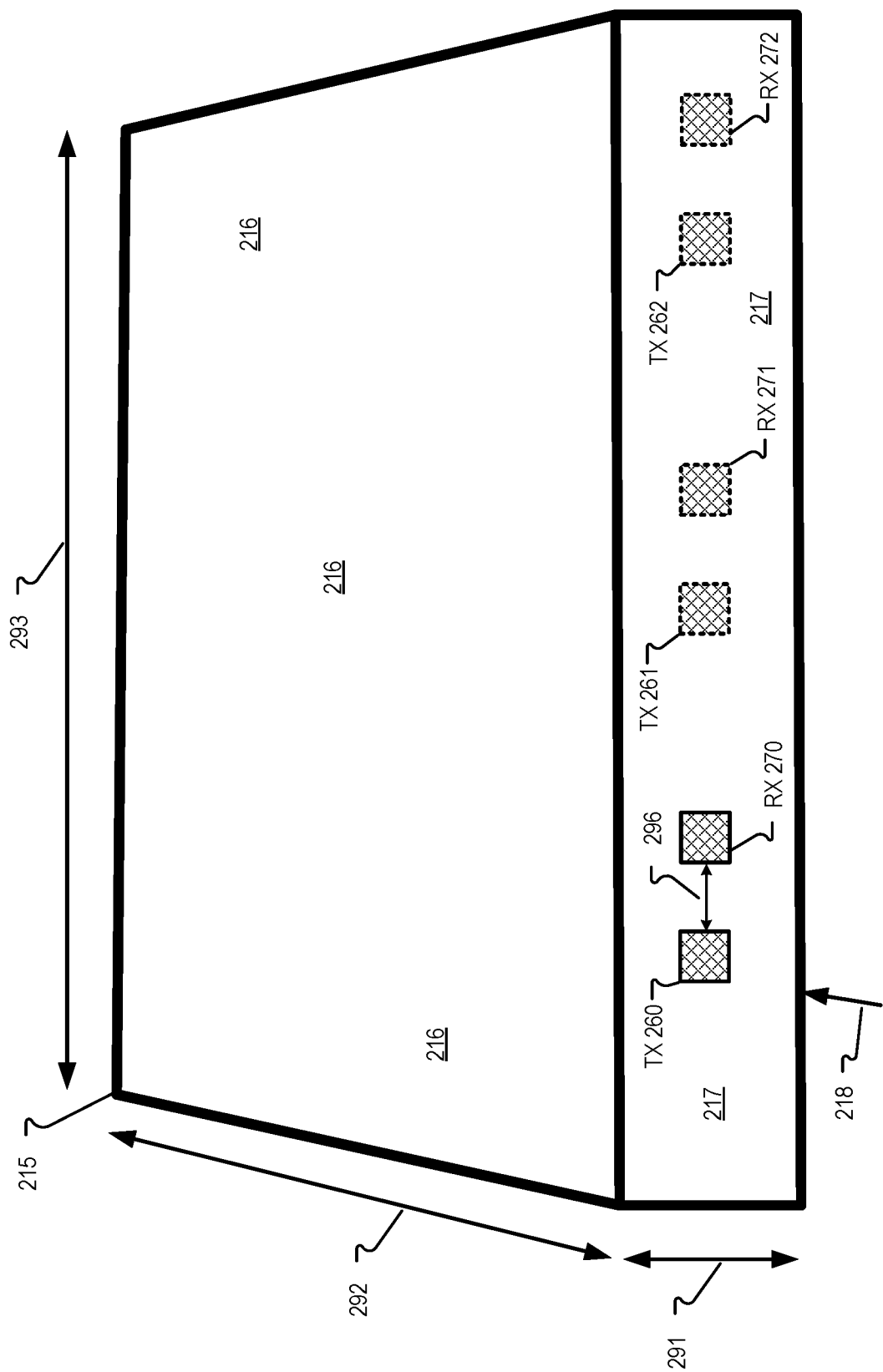

FIG. 2B illustrates an additional edge-coupled pixel implementation, in accordance with aspects of the disclosure. The transmit and receive pixels in FIG. 2B are arranged horizontally rather than vertically. In FIG. 2B, transmit pixel 260 is an edge-coupled transmit pixel configured to emit a transmit beam (e.g. transmit beam 133) along edge 217 of substrate layer 215. The transmit beam (not specifically illustrated) may be emitted in an out-of-the-page direction that is orthogonal to edge 217, for example. The transmit beam may be emitted at an angle that is not orthogonal to edge 217, in other implementations. Still referring to FIG. 2B, receive pixel 270 is an edge-coupled receive pixel configured to receive a returning beam (e.g. returning beam 140) along edge 217 of substrate layer 215. The returning beam (not specifically illustrated) may propagate in-to-the-page in a direction that is orthogonal to edge 217, for example. The returning beam may also propagate in a direction that is not orthogonal to edge 217, in other implementations. Edge-coupled transmit pixel 260 is offset from edge-coupled receive pixel 270 by an offset dimension 296.

Edge-coupled transmit pixel 260 and edge-coupled receive pixel 270 may be disclosed approximately a same distance from first surface 216. Optionally, substrate layer 215 may have an array of edge-coupled transmit pixels and edge-coupled receive pixels such as second transmit pixel 261 paired with second received pixel 271, and third transmit pixel 262 paired with third receive pixel 272. Of course, the array of edge-coupled pixels is not limited to three pairs of pixels and may include any number of pairs of pixels.

Figure 3:
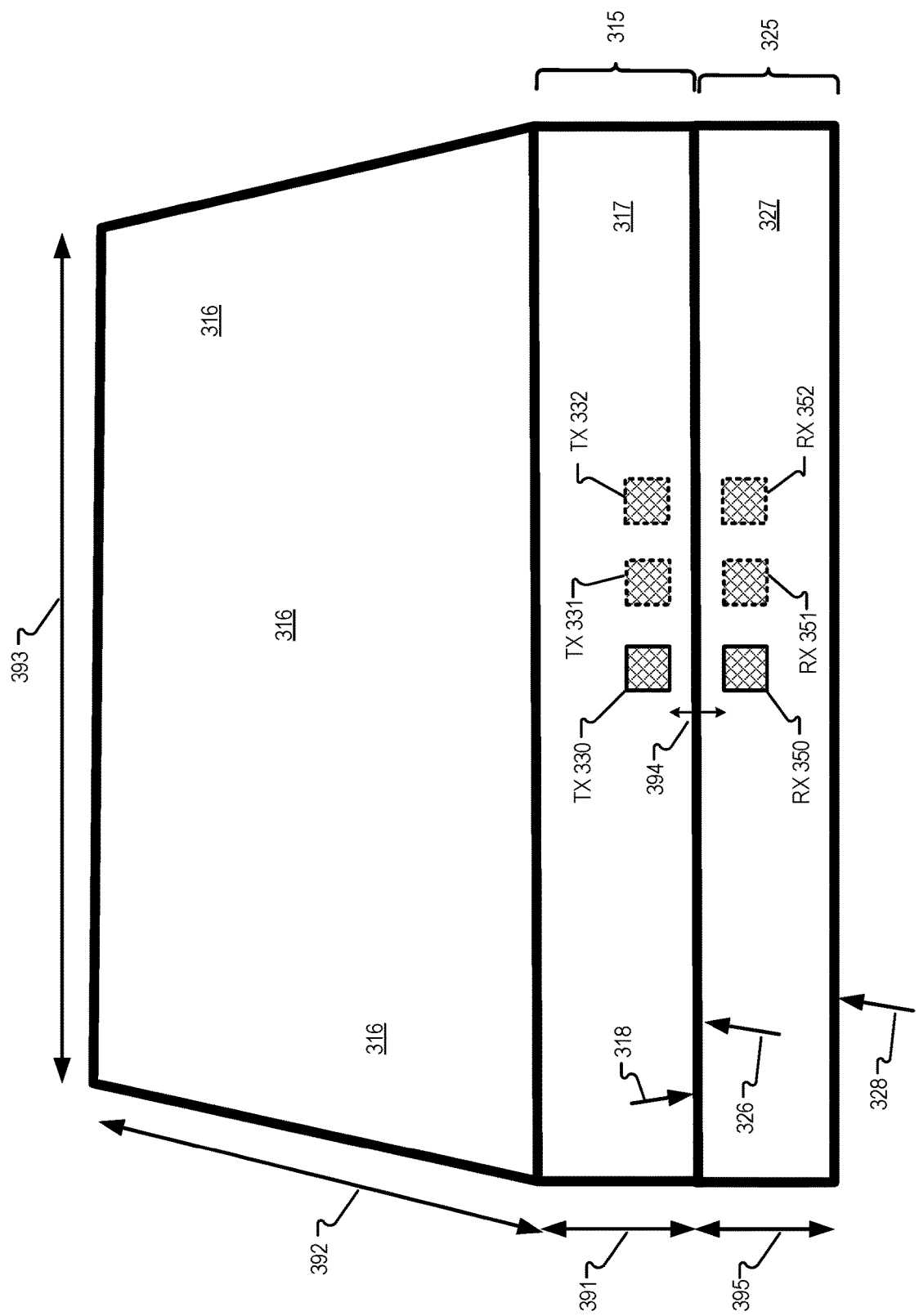
FIG. 3 illustrates a dual-substrate pixel configuration, in accordance with aspects of the disclosure.

FIG. 3 illustrates a dual-substrate pixel configuration, in accordance with aspects of the disclosure. FIG. 3 illustrates that a first substrate layer 315 including transmit pixels and a second substrate layer 325 including receive pixels. First substrate layer 315 may be coupled to second substrate layer 325. First substrate layer 315 may be bonded to second substrate layer 325. An intermediate layer may be disposed between first substrate layer 315 and second substrate layer 325.

Substrate layer 315 includes a first surface 316 disposed opposite a second surface 318. An edge 317 of substrate layer 315 is disposed between the first surface 316 and the second surface 318. Edge 317 may be approximately perpendicular to first surface 316 and second surface 318. Substrate layer 315 has a depth/thickness 391, a width 392, and a length 393. First surface 316 also has a width 392 and a length 393, in FIG. 3. Second surface 318 may also have a width 392 and a length 393. Depth/thickness 391 has a dimension that is less than width 392 and length 393. Substrate layer 315 may be a portion of a wafer that was diced, in some implementations.

Substrate layer 325 includes a first surface 326 disposed opposite a second surface 328. An edge 327 of substrate layer 325 is disposed between the first surface 326 and the second surface 328. Edge 327 may be approximately perpendicular to first surface 326 and second surface 328. Substrate layer 325 has a depth/thickness 395, a width 392, and a length 393. First surface 326 also has a width 392 and a length 393, in FIG. 3. Second surface 328 may also have a width 392 and a length 393. Depth/thickness 395 has a dimension that is less than width 392 and length 393. Substrate layer 325 may be a portion of a wafer that was diced, in some implementations.

In FIG. 3, transmit pixel 330 is an edge-coupled transmit pixel configured to emit a transmit beam (e.g. transmit beam 133) along edge 317 of substrate layer 315. The transmit beam (not specifically illustrated) may be emitted in an out-of-the-page direction that is orthogonal to edge 317, for example. The transmit beam may be emitted at an angle that is not orthogonal to edge 317, in other implementations.

Still referring to FIG. 3, receive pixel 350 is an edge-coupled receive pixel configured to receive a returning beam (e.g. returning beam 140) along edge 327 of substrate layer 325. The returning beam (not specifically illustrated) may propagate in-to-the-page in a direction that is orthogonal to edge 327, for example. The returning beam may also propagate in a direction that is not orthogonal to edge 327, in other implementations. Edge-coupled transmit pixel 330 is offset from edge-coupled receive pixel 350 by an offset dimension 394.

Optionally, substrate layer 315 may have an array of edge-coupled transmit pixels such as second transmit pixel 331 and third transmit pixel 332 while substrate layer 325 may have an array of edge-coupled receive pixels such as second received pixel 351 and third receive pixel 352. Of course, the array of edge-coupled transmit and receive pixels is not limited to three pixels and may include any number of pairs of pixels.

While not particularly illustrated, all or a portion of the components of transmit portion 102 of FIG. 1 may be fabricated into or coupled to substrate layer 315 and all or a portion of the components of receive portion 103 of FIG. 1 may be fabricated into or coupled to substrate layer 325. In an implementation, substrate layer 315 includes Group 3 or Group 5 elements. For purposes of this disclosure, Group 3 includes Boron, Aluminum, Gallium, Indium, and thallium and Group 5 includes Nitrogen, Phosphorus, Arsenic, Antimony, and Bismuth. Substrate layer 325 may include Group 4 elements including Silicon and Germanium Having the transmit portion 102 in substrate layer 315 including Group 3 or Group 5 elements may be advantageous since Group 3 and Group 5 elements are traditionally used for light sources such as LEDs and lasers, whereas light guiding materials from Group 4 are better suited for light guiding functionality and thus receive portion 103 may be better implemented in substrate layer 325. In an implementation, substrate layer 325 may be silicon dioxide and waveguides 121, 151, 161, and 162 included in substrate layer 325 are formed of silicon nitride with the silicon dioxide of substrate layer 325 functioning as a cladding layer. Polarized beam splitter 160 may be formed in a void in substrate layer 325 using deposition fabrication techniques. Substrate layer 325 may be transparent to infrared wavelengths.

Figure 4:
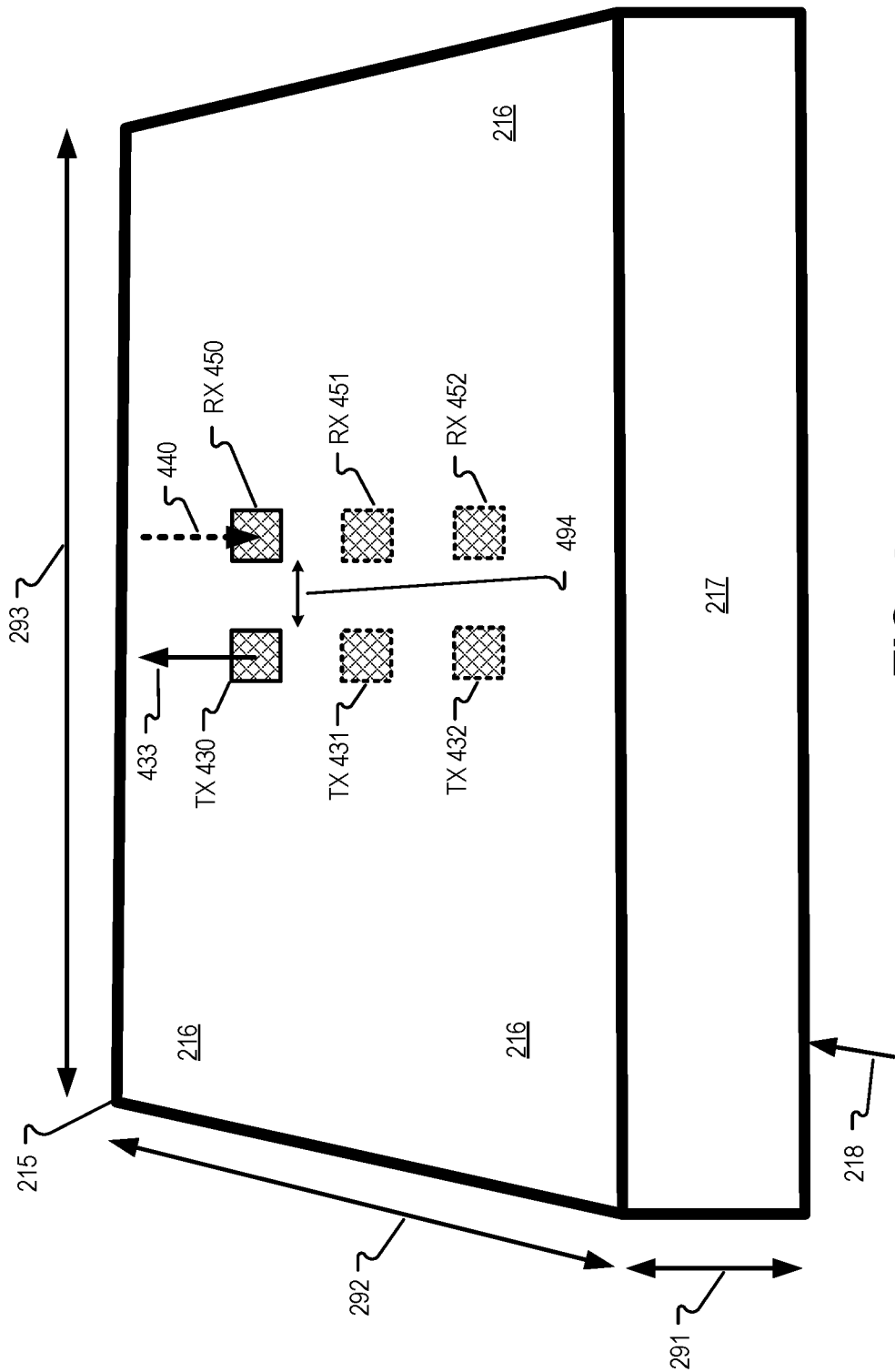
FIG. 4 illustrates a surface-emitting pixel configuration, in accordance with aspects of the disclosure.

FIG. 4 illustrates a surface-emitting pixel configuration, in accordance with aspects of the disclosure. In FIG. 4, transmit pixel 430 is a surface-emitting transmit pixel configured to emit transmit beam 433 through surface 216 of substrate layer 215. Transmit beam 433 may be emitted in a direction that is orthogonal to surface 216, for example. Transmit beam 433 may be emitted at an angle that is not orthogonal to surface 216, in other implementations. Receive pixel 450 is a surface-receiving receive pixel configured to receive returning beam 440 through surface 216 of substrate layer 215. Returning beam 440 may propagate in a direction that is orthogonal to surface 216, for example. Returning beam 440 may also propagate in a direction that is not orthogonal to surface 216, in other implementations. Surface-emitting transmit pixel 430 is offset from surface-receiving receive pixel 450 by an offset dimension 494.

Optionally, substrate layer 215 may have an array of surface-emitting transmit pixels and surface-receiving receive pixels such as second transmit pixel 431 paired with second receive pixel 451, and third transmit pixel 432 paired with third receive pixel 452. Of course, the array of pixels is not limited to three pairs of pixels and may include any number of pairs of pixels.

While not particularly illustrated, all or a portion of the components of transmit portion 102 and receive portion 103 of FIG. 1 may be fabricated into or coupled to substrate layer 215 of FIG. 4. For example, polarized beam splitter 160 and/or waveguides 121, 151, 161, and 162 may be included in substrate layer 215. In an implementation, substrate layer 215 may be silicon dioxide and waveguides 121, 151, 161, and 162 are formed of silicon nitride with the silicon dioxide of substrate layer 215 functioning as a cladding layer. Polarized beam splitter 160 may be formed in a void in substrate layer 215 using deposition fabrication techniques. Substrate layer 215 may be transparent to infrared wavelengths.

1. System Environment for Autonomous Vehicles

Figure 5A:
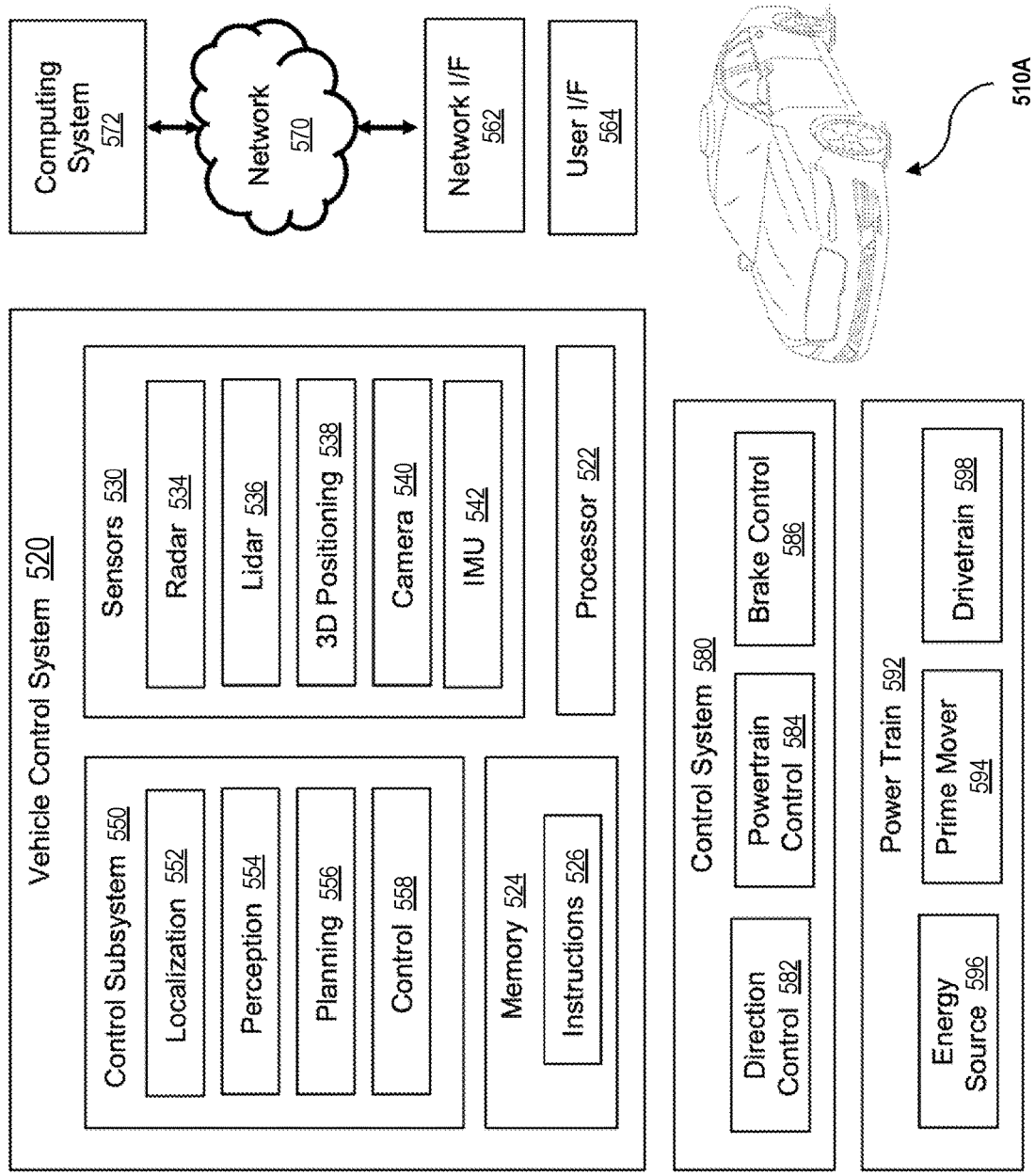
FIG. 5A illustrates a block diagram of an example of a system environment for autonomous vehicles, in accordance with implementations of the disclosure.

FIG. 5A is a block diagram illustrating an example of a system environment for autonomous vehicles according to some implementations.

Referring to FIG. 5A, an example autonomous vehicle 510A within which the various techniques disclosed herein may be implemented. The vehicle 510A, for example, may include a powertrain 592 including a prime mover 594 powered by an energy source 596 and capable of providing power to a drivetrain 598, as well as a control system 580 including a direction control 582, a powertrain control 584, and a brake control 586. The vehicle 510A may be implemented as any number of different types of vehicles, including vehicles capable of transporting people and/or cargo, and capable of traveling in various environments, and it will be appreciated that the aforementioned components 580-598 can vary widely based upon the type of vehicle within which these components are utilized.

For simplicity, the implementations discussed hereinafter will focus on a wheeled land vehicle such as a car, van, truck, bus, etc. In such implementations, the prime mover 594 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 598 can include wheels and/or tires along with a transmission and/or any other mechanical drive components to convert the output of the prime mover 594 into vehicular motion, as well as one or more brakes configured to controllably stop or slow the vehicle 510A and direction or steering components suitable for controlling the trajectory of the vehicle 510A (e.g., a rack and pinion steering linkage enabling one or more wheels of the vehicle 510A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 582 may include one or more actuators and/or sensors for controlling and receiving feedback from the direction or steering components to enable the vehicle 510A to follow a desired trajectory. The powertrain control 584 may be configured to control the output of the powertrain 502, e.g., to control the output power of the prime mover 594, to control a gear of a transmission in the drivetrain 598, etc., thereby controlling a speed and/or direction of the vehicle 510A. The brake control 516 may be configured to control one or more brakes that slow or stop vehicle 510A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 510A can be implemented in a vehicle control system 520, which may include one or more processors 522 and one or more memories 524, with each processor 522 configured to execute program code instructions 526 stored in a memory 524. The processors(s) can include, for example, graphics processing unit(s) ("GPU(s)")) and/or central processing unit(s) ("CPU(s)").

Sensors 530 may include various sensors suitable for collecting information from a vehicle's surrounding environment for use in controlling the operation of the vehicle. For example, sensors 530 can include radar sensor 534, lidar (Light Detection and Ranging) sensor 536, a 3D positioning sensors 538, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 538 can be used to determine the location of the vehicle on the Earth using satellite signals. The sensors 530 can include a camera 540 and/or an IMU (inertial measurement unit) 542. The camera 540 can be a monographic or stereographic camera and can record still and/or video images. The IMU 542 can include multiple gyroscopes and accelerometers capable of detecting linear and rotational motion of the vehicle in three directions. One or more encoders (not illustrated), such as wheel encoders may be used to monitor the rotation of one or more wheels of vehicle 510A. Each sensor 530 can output sensor data at various data rates, which may be different than the data rates of other sensors 530.

The outputs of sensors 530 may be provided to a set of control subsystems 550, including, a localization subsystem 552, a planning subsystem 556, a perception subsystem 554, and a control subsystem 558. The localization subsystem 552 can perform functions such as precisely determining the location and orientation (also sometimes referred to as "pose") of the vehicle 510A within its surrounding environment, and generally within some frame of reference. The location of an autonomous vehicle can be compared with the location of an additional vehicle in the same environment as part of generating labeled autonomous vehicle data. The perception subsystem 554 can perform functions such as detecting, tracking, determining, and/or identifying objects within the environment surrounding vehicle 510A. A machine learning model can be utilized in tracking objects. The planning subsystem 556 can perform functions such as planning a trajectory for vehicle 510A over some timeframe given a desired destination as well as the static and moving objects within the environment. A machine learning can be utilized in planning a vehicle trajectory. The control subsystem 558 can perform functions such as generating suitable control signals for controlling the various controls in the vehicle control system 520 in order to implement the planned trajectory of the vehicle 510A. A machine learning model can be utilized to generate one or more signals to control an autonomous vehicle to implement the planned trajectory.

It will be appreciated that the collection of components illustrated in FIG. 5A for the vehicle control system 520 is merely exemplary in nature. Individual sensors may be omitted in some implementations. Additionally or alternatively, in some implementations, multiple sensors of types illustrated in FIG. 5A may be used for redundancy and/or to cover different regions around a vehicle, and other types of sensors may be used. Likewise, different types and/or combinations of control subsystems may be used in other implementations. Further, while subsystems 552-558 are illustrated as being separate from processor 522 and memory 524, it will be appreciated that in some implementations, some or all of the functionality of a subsystem 552-558 may be implemented with program code instructions 526 resident in one or more memories 524 and executed by one or more processors 522, and that these subsystems 552-558 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 520 may be networked in various manners.

In some implementations, the vehicle 510A may also include a secondary vehicle control system (not illustrated), which may be used as a redundant or backup control system for the vehicle 510A. The secondary vehicle control system may be capable of fully operating the autonomous vehicle 510A in the event of an adverse event in the vehicle control system 520, while in other implementations, the secondary vehicle control system may only have limited functionality, e.g., to perform a controlled stop of the vehicle 510A in response to an adverse event detected in the primary vehicle control system 520. In still other implementations, the secondary vehicle control system may be omitted.

In general, an innumerable number of different architectures, including various combinations of software, hardware, circuit logic, sensors, networks, etc. may be used to implement the various components illustrated in FIG. 5A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 510A, e.g., any cache memory in a processor, as well as any storage capacity used as a virtual memory, e.g., as stored on a mass storage device or another computer controller. One or more processors illustrated in FIG. 5A, or entirely separate processors, may be used to implement additional functionality in the vehicle 510A outside of the purposes of autonomous control, e.g., to control entertainment systems, to operate doors, lights, convenience features, etc.

In addition, for additional storage, the vehicle 510A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 510A may include a user interface 564 to enable vehicle 510A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 510A may include one or more network interfaces, e.g., network interface 562, suitable for communicating with one or more networks 570 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 510A receives environmental and other data for use in autonomous control thereof. Data collected by the one or more sensors 530 can be uploaded to a computing system 572 via the network 570 for additional processing. A time stamp can be added to each instance of vehicle data prior to uploading.

Each processor illustrated in FIG. 5A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 510A via network 570, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 5A is not intended to limit implementations disclosed herein. Indeed, other alternative hardware and/or software environments may be used without departing from the scope of implementations disclosed herein.

2. Coherent LIDAR for Automotive Applications

A truck can include a lidar system that includes the implementations of FIGS. 1-4. In some implementations, the lidar system can use frequency modulation to encode an optical signal and scatter the encoded optical signal into free-space using optics. For example, by detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). In some implementations, the lidar system can use phase modulation (PM) to encode an optical signal and scatters the encoded optical signal into free-space using optics.

An FM or PM lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 530 in FIG. 5A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hit the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 530 in FIG. 5A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 530 in FIG. 5A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some or all of the optical components for an FM lidar can be produced on a single chip, which produces its own benefits, as discussed herein.

3. Commercial Trucking

Figure 5B:
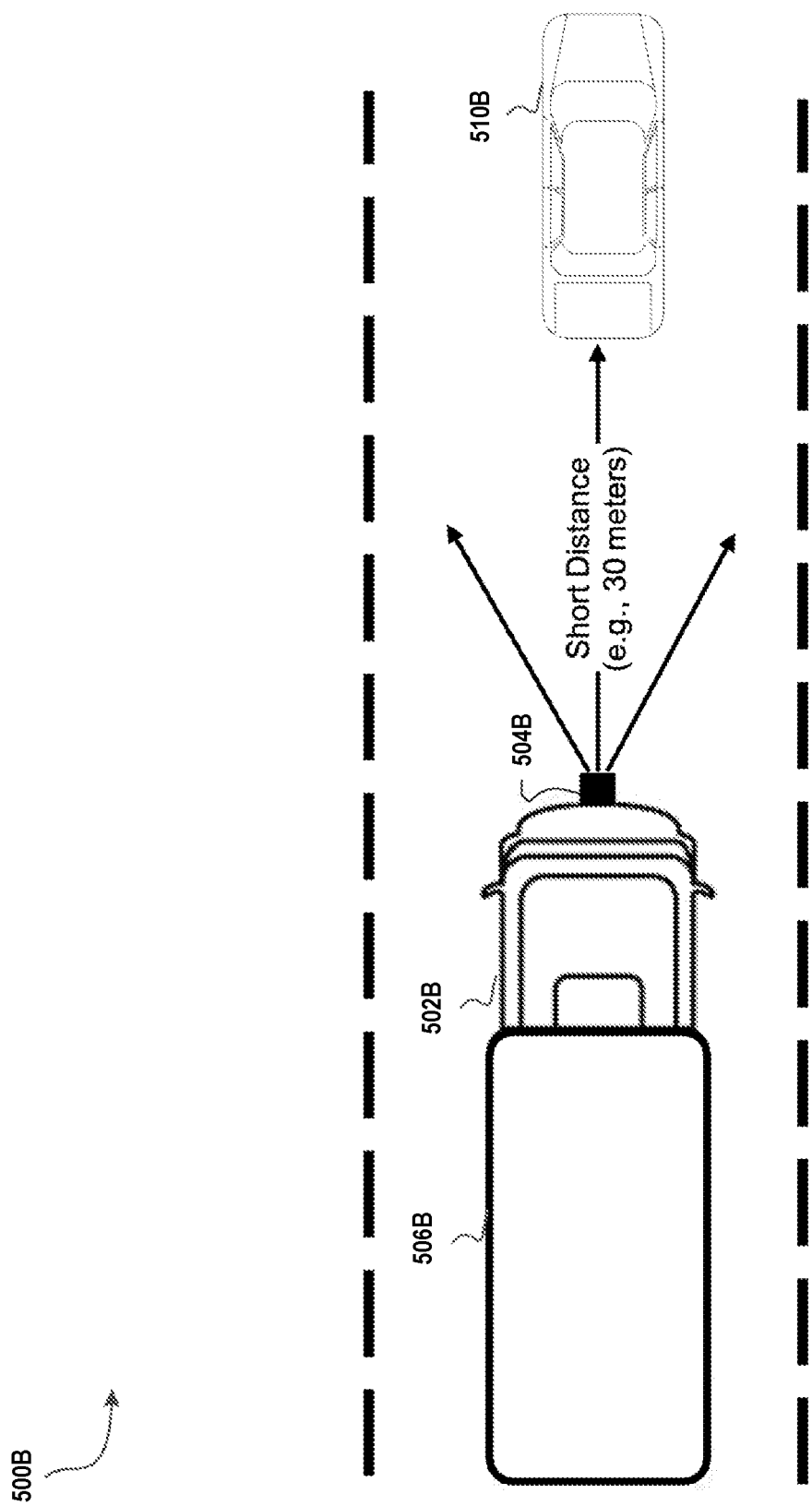
FIG. 5B illustrates a block diagram of an example of a system environment for autonomous commercial trucking vehicles, in accordance with implementations of the disclosure.

FIG. 5B is a block diagram illustrating an example of a system environment for autonomous commercial trucking vehicles, according to some implementations. The environment 500B includes a commercial truck 502B for hauling cargo 506B. In some implementations, the commercial truck 502B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 502B may be a flatbed truck, a refrigerated truck (e.g., a reefer truck), a vented van (e.g., dry van), a moving truck, etc. The cargo 506B may be goods and/or produce. The commercial truck 502B may include a trailer to carry the cargo 506B, such as a flatbed trailer, a lowboy trailer, a step deck trailer, an extendable flatbed trailer, a sidekit trailer, etc.

The environment 500B includes an object 510B (shown in FIG. 5B as another vehicle) that is within a distance range that is equal to or less than 30 meters from the truck.

The commercial truck 502B may include a lidar system 504B (e.g., an FM lidar system, vehicle control system 520 in FIG. 5A) for determining a distance to the object 510B and/or measuring the velocity of the object 510B. Although FIG. 5B shows that one lidar system 504B is mounted on the front of the commercial truck 502B, the number of lidar system and the mounting area of the lidar system on the commercial truck are not limited to a particular number or a particular area. The commercial truck 502B may include any number of lidar systems 504B (or components thereof, such as sensors, modulators, coherent signal generators, etc.) that are mounted onto any area (e.g., front, back, side, top, bottom, underneath, and/or bottom) of the commercial truck 502B to facilitate the detection of an object in any free-space relative to the commercial truck 502B.

As shown, the lidar system 504B in environment 500B may be configured to detect an object (e.g., another vehicle, a bicycle, a tree, street signs, potholes, etc.) at short distances (e.g., 30 meters or less) from the commercial truck 502B.

Figure 5C:
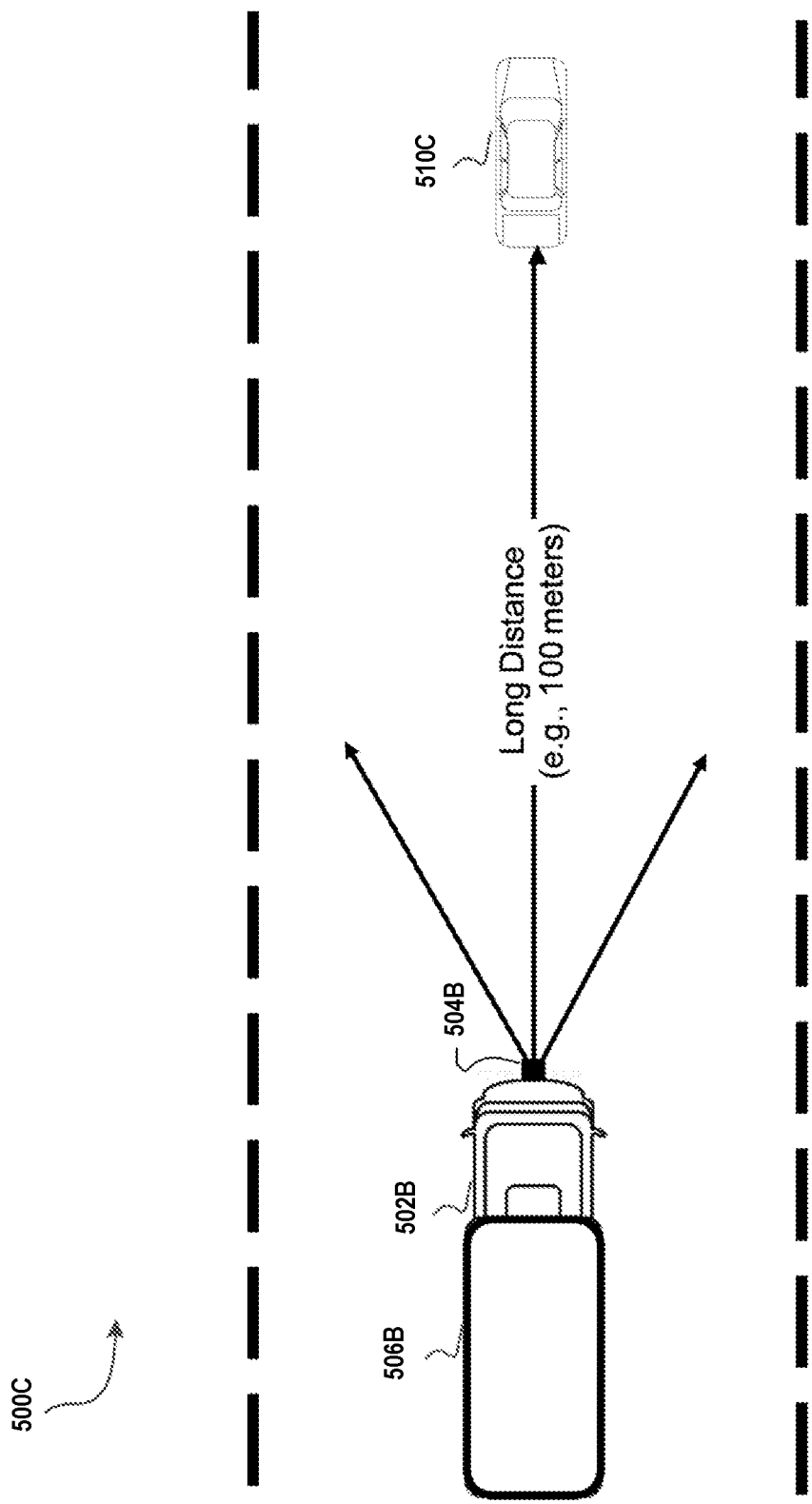
FIG. 5C illustrates a block diagram of an example of a system environment for autonomous commercial trucking vehicles, in accordance with implementations of the disclosure.

FIG. 5C is a block diagram illustrating an example of a system environment for autonomous commercial trucking vehicles, according to some implementations. The environment 500C includes the same components (e.g., commercial truck 502B, cargo 506B, lidar system 504B, etc.) that are included in environment 500B.

The environment 500C includes an object 510C (shown in FIG. 5C as another vehicle) that is within a distance range that is (i) more than 30 meters and (ii) equal to or less than 150 meters from the commercial truck 502B. As shown, the lidar system 504B in environment 500C may be configured to detect an object (e.g., another vehicle, a bicycle, a tree, street signs, potholes, etc.) at a distance (e.g., 100 meters) from the commercial truck 502B.

Figure 5D:
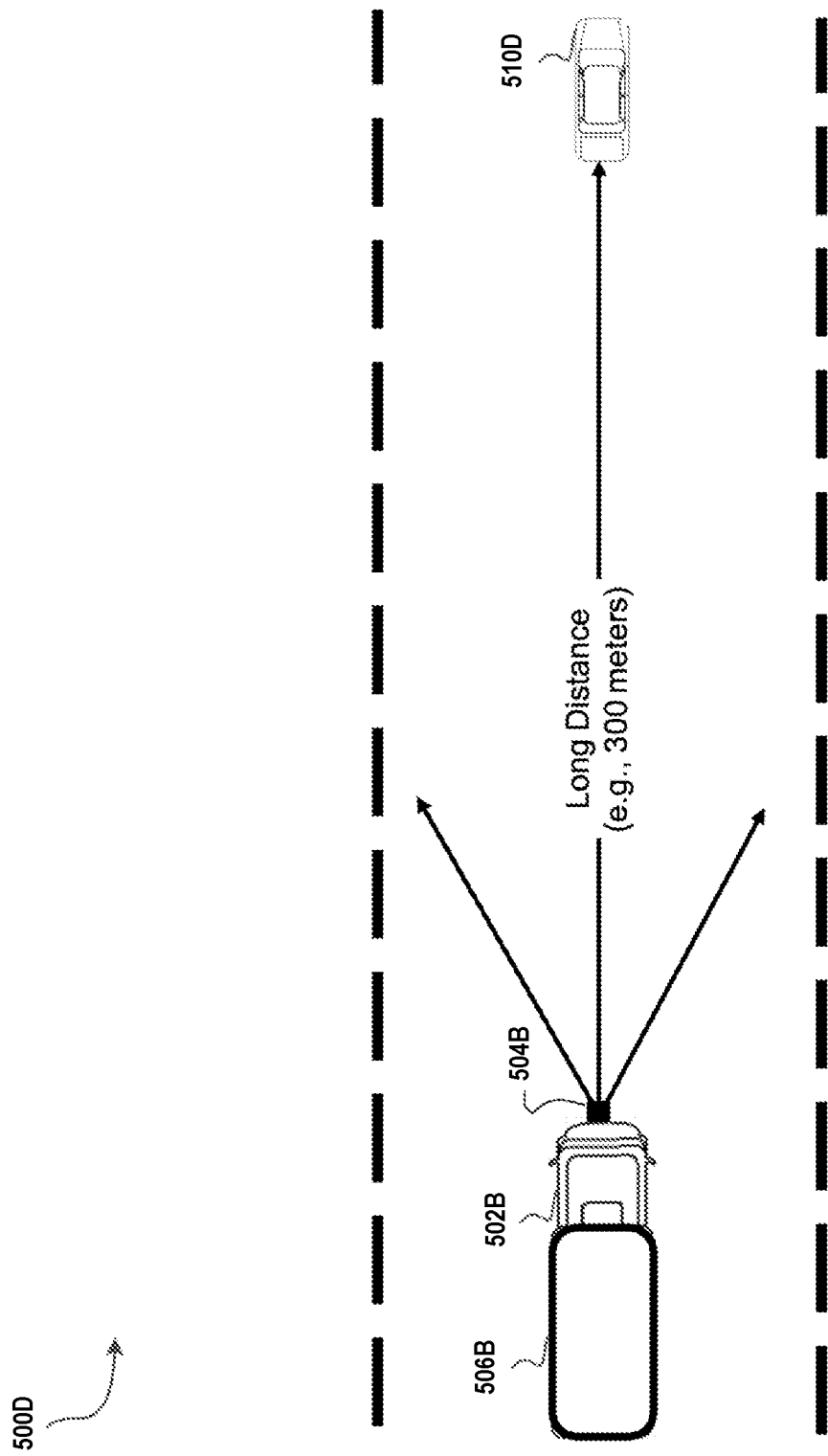
FIG. 5D illustrates a block diagram of an example of a system environment for autonomous commercial trucking vehicles, in accordance with implementations of the disclosure.

FIG. 5D is a block diagram illustrating an example of a system environment for autonomous commercial trucking vehicles, according to some implementations. The environment 500D includes the same components (e.g., commercial truck 502B, cargo 506B, lidar system 504B, etc.) that are included in environment 500B.

The environment 500D includes an object 510D (shown in FIG. 5D as another vehicle) that is within a distance range that is more than 150 meters from the commercial truck 502B. As shown, the lidar system 504B in environment 500D may be configured to detect an object (e.g., another vehicle, a bicycle, a tree, street signs, potholes, etc.) at a distance (e.g., 300 meters) from the commercial truck 502B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semi-autonomous applications, in which the commercial truck has a driver and some functions of the commercial truck are autonomously operated using the FM or PM lidar system, or fully autonomous applications, in which the commercial truck is operated entirely by the FM or lidar system, alone or in combination with other vehicle systems.

4. Continuous Wave Modulation and Quasi-Continuous Wave Modulation

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for Automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

In implementations of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) sensor system for a vehicle, the LIDAR sensor system comprising:
a transmit pixel configured to emit a transmit beam to optically interact with an object in an environment of the vehicle;
a receive pixel configured to receive (i) a first polarization orientation of a returning beam that is received in response to the transmit beam optically interacting with the object; and (ii) a second polarization orientation of the returning beam; and
a polarized beam splitter optically coupled directly to the receive pixel and configured to:
receive the returning beam from the receive pixel,
direct the first polarization orientation of the returning beam into a first waveguide towards a first optical mixer, and
direct the second polarization orientation of the returning beam into a second waveguide towards a second optical mixer.

2. The LIDAR sensor system of claim 1, further comprising:
a substrate layer in which the polarized beam splitter is disposed, wherein the transmit pixel is an edge-coupled transmit pixel configured to emit the transmit beam along an edge of the substrate layer, and wherein the receive pixel is an edge-coupled receive pixel configured to receive the returning beam along the edge of the substrate layer.

3. The LIDAR sensor system of claim 1, further comprising:
a first substrate layer, wherein the transmit pixel is an edge-coupled transmit pixel configured to emit the transmit beam along a first edge of the first substrate layer; and
a second substrate layer coupled to the first substrate layer, wherein the receive pixel is an edge-coupled receive pixel configured to receive the returning beam along a second edge of the second substrate layer, and wherein the second substrate layer includes the polarized beam splitter, the first waveguide, and the second waveguide.

4. The LIDAR sensor system of claim 3, wherein the second substrate layer includes a Group 4 element, and wherein the first substrate layer includes a Group 3 or Group 5 element.

5. The LIDAR sensor system of claim 4, wherein the Group 4 element include germanium or silicon, and wherein the Group 3 or Group 5 element includes aluminum, gallium, indium, thallium, phosphorus, or arsenic.

6. The LIDAR sensor system of claim 1 further comprising:
a substrate layer including the polarized beam splitter, the first waveguide, and the second waveguide, wherein the transmit pixel is surface-emitting through a substrate layer, and wherein the receive pixel is surface-receiving through the substrate layer.

7. The LIDAR sensor system of claim 1, wherein the transmit pixel is offset from the receive pixel by an offset dimension.

8. The LIDAR sensor system of claim 7, wherein the transmit pixel and the receive pixel are included in a substrate layer having a first surface disposed opposite a second surface, and wherein the transmit pixel is disposed closer to the first surface and the receive pixel is disposed closer to the second surface.

9. The LIDAR sensor system of claim 1 further comprising:
a receive waveguide optically coupled between the receive pixel and the polarized beam splitter, wherein the receive waveguide is configured to transmit the returning beam from the receive pixel to the polarized beam splitter.

10. The LIDAR sensor system of claim 1, wherein the transmit pixel is configured to emit the transmit beam in the first polarization orientation and the second polarization orientation.

11. The LIDAR sensor system of claim 1, wherein the first polarization orientation is orthogonal to the second polarization orientation.

12. The LIDAR sensor system of claim 1, wherein the transmit beam and the returning beam are a narrow-band near-infrared wavelength having a linewidth less than 0.02 nm.

13. The LIDAR sensor system of claim 1 further comprising:
a substrate layer including a transmit waveguide, wherein the transmit waveguide delivers source light to the transmit pixel, and wherein the transmit pixel is configured to emit the transmit beam in response to receiving the source light,
the substrate layer also including the first waveguide and the second waveguide.

14. An autonomous vehicle control system for an autonomous vehicle, the autonomous vehicle control system comprising:
a light detection and ranging (LIDAR) sensor system including:
a transmit pixel configured to emit a transmit beam to optically interact with an object in an environment of the autonomous vehicle;
a receive pixel configured to receive a returning beam that is received in response to the transmit beam optically interacting with the object; and
a polarized beam splitter optically coupled directly to the receive pixel and configured to receive the returning beam from the receive pixel, wherein the polarized beam splitter is configured to direct a first polarization orientation of the returning beam into a first waveguide towards a first optical mixer and configured to direct a second polarization orientation of the returning beam into a second waveguide towards a second optical mixer; and
one or more processors configured to control the autonomous vehicle in response to the returning beam.

15. The autonomous vehicle control system of claim 14, wherein the returning beam is the transmit beam reflecting off of the object.

16. The autonomous vehicle control system of claim 14, wherein the transmit pixel is offset from the receive pixel by an offset dimension.

17. The autonomous vehicle control system of claim 14, wherein the transmit beam and the returning beam are a same narrow-band near-infrared wavelength having a linewidth less than 0.02 nm.

18. The autonomous vehicle control system of claim 14 further comprising:
a substrate layer wherein the transmit pixel is an edge-coupled transmit pixel configured to emit the transmit beam along an edge of the substrate layer that the polarized beam splitter is disposed in, and wherein the receive pixel is an edge-coupled receive pixel configured to receive the returning beam along the edge of the substrate layer.

19. The autonomous vehicle control system of claim 14, wherein one or more processors is configured to generate a LIDAR image in response to:
   a first intensity of the first polarization orientation of the returning beam; and
   a second intensity of the second polarization orientation of the returning beam, wherein the one or more processors is configured to control the autonomous vehicle in response to the LIDAR image.

20. An autonomous vehicle comprising:
   a light detection and ranging (LIDAR) sensor system including:
      a substrate layer;
      a transmit pixel configured to emit a transmit beam to optically interact with an object in an environment of the autonomous vehicle;
      a receive pixel configured to receive a returning beam that is received in response to the transmit beam optically interacting with the object; and
      a polarized beam splitter optically coupled directly to the receive pixel and configured to receive the returning beam from the receive pixel, wherein the polarized beam splitter is configured to direct a first polarization orientation of the returning beam into a first waveguide towards a first optical mixer and configured to direct a second polarization orientation of the returning beam into a second waveguide towards a second optical mixer, wherein the transmit pixel, the receive pixel, the polarized beam splitter, the first waveguide, and the second waveguide are disposed in the substrate layer; and
   one or more processors configured to control the autonomous vehicle in response to the returning beam.

* * * * *